Figure 1:
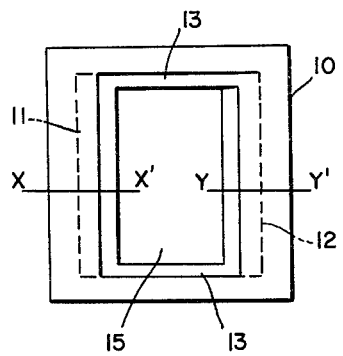

Dec. 25, 1962  A. L. LIEBERMAN  3,069,795
PHOTOGRAPHIC SLIDE MOUNT
Filed Oct. 29, 1959

INVENTOR
AARON LOUIS LIEBERMAN

BY
OSTROLENK, FABER, GERB & SOFFEN
ATTORNEYS

United States Patent Office 3,069,795
Patented Dec. 25, 1962

3,069,795
PHOTOGRAPHIC SLIDE MOUNT
Aaron L. Lieberman, 7816A Penrose Ave.,
Elkins Park 17, Pa.
Filed Oct. 29, 1959, Ser. No. 849,583
2 Claims. (Cl. 40—152)

The developments in the field of photographic slides have not solved some of the problems confronting the consumers. It has been found that the devices presently available do not protect the transparencies from scratches, fingerprints and dirt. A device is needed that will not only provide protection from the defects mentioned above but in addition will be non-absorbent, permanently hold its original shape, and readily fit into any and all manual and automatic projection machines.

The recognition of the above problems have led to the development of the invention described in this disclosure. The invention also provides a device which may be mounted or dismantled by hand either in daylight or in a poorly lit room with equal ease. The rigidity of the photograph's transparency is maintained without use of glue, adhesives, high pressure or other fastening devices.

The present invention relates to a film holding device for mounting photographic film strips and is especially adapted for use in producing slides, whereby the film is protected against injury due to scratching, dust, humidity, etc.

The film mounts previously devised are usually made from light weight sheet metal or relatively stiff paper and must be destroyed to remove the film strip therefrom. Such mounts are also difficult to handle in a projection room.

An object of this invention is to make an improved film mounting device.

Another object is to make a holder which can readily be used in projection machines.

Another object is to make a holder which is simple and inexpensive to manufacture.

Another object is to make a holder which can receive film strips with relative simplicity and can be unloaded with even greater ease.

Another object is to make a holder which will not display finger prints or other marks upon the projection screen regardless of how carelessly the holder is handled when being fed into the projection machine.

Another object is to make a holder which can be used over and over again without any loss in its efficiency.

Another object is to make a holder which will hold the film strip in place with no movement therein when properly seated.

Another object is to make a holder which can withstand bending with no harm to either the film mount or the film strip.

Figure 3:
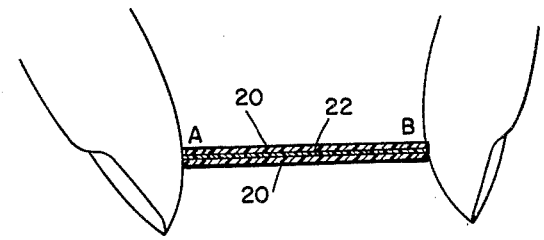
Figure 2:
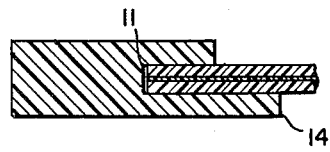
Figure 4:
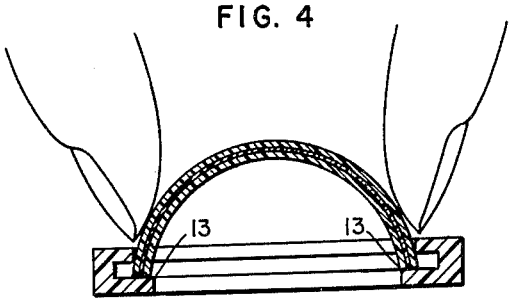
Figure 2A:
Figure 5:
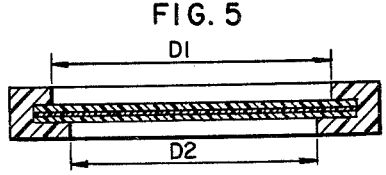
Figure 2B:
Figure 6:
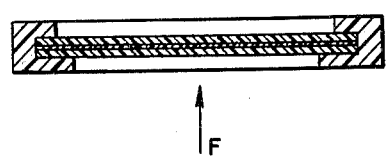

Other objects of this invention will be apparent from the following detailed description, accompanying drawings and claims. In the drawings:

FIGURE 1 is a top view of the film mounting device.
FIGURE 2 is a cross section of FIGURE 1 at line X—X'.
FIGURE 2A is a modification of the cross section at X—X' in FIGURE 1.
FIGURE 2B is another modification of the cross section at X—X' of FIGURE 1.
FIGURES 3, 4 and 5 display the steps used in mounting the film strips into the film holder.

Referring to the drawings in detail the film holder comprises a film holding frame 10 of rectangular shape having a rectangular opening designated generally by numeral 15. The film mount is constructed of a plastic material which is of sufficient rigidity to remain flat. Further, a plastic material was chosen which did not warp so that it could be used in a film projector or other viewing means without jamming. On all four edges of the opening is a ledge 13. This ledge can best be seen by referring to FIGURE 2. The dimensions of the ledges are such that its inner periphery is exactly the same as the perimeter of the picture on the film strip so that the ledge 13 "frames" the picture. Two opposite sides of the opening in the holder 10 contain slots 11 into which two opposite sides of the film strip are inserted.

The cross section of the film holder is shown in FIGURES 2, 2A and 2B. The holder may be cast as shown in FIGURE 2 from one solid piece of plastic material. Or it may be composed of two or three sheets of plastic material (see FIGURES 2A and 2B respectively) which are laminated together after each piece is formed.

FIGURE 3 shows the manner in which the film strip 22 is combined with two plastic strips 20. The two plastic strips 20 are cut to the same dimensions as the film strip. They are made of a translucent plastic which exhibits a high degree of resiliency. The plastic strips 20 are similar in looks to a piece of frosted or ground glass. They have the same smoky white consistency and for this reason do not show fingerprints as readily as a transparent piece of glass or plastic. The film strip 22 is placed between the two plastics strips 20 to form a compact "sandwich."

The method of inserting the film strip into the film mount is as follows: The film strip is placed between two pieces of frosted plastic having the same dimensions as the film strip. This "sandwich" is then squeezed together so that the opposite ends A and B approach one another as shown in FIGURE 4. The two opposite ends are drawn together just far enough so that the distance between them is less than the distance between the opposite sides of the widest part of the opening D1 (as shown in FIGURE 5) but greater than the distance between the narrowest part of the opening D2. The sandwich in its arcuate state is then placed on the ledge 13. The force then holding the sandwich in the arcuate shape may now be released. The resiliency of the frosted plastic strips 22 causes the plastic strips to return to their original shape. This causes the ends A and B to force themselves into the slots 11 and 12 respectively. The film is now properly mounted in the film holder and is ready to be inserted in a photographic projector or other viewing means. The sides of the slide holder 13 which do not have slots therein nevertheless have ledges which act to aid the frosted plastic strips with the accompanying film strip sandwiched therebetween to remain flat so that no warping or sagging will occur.

Figure 7:
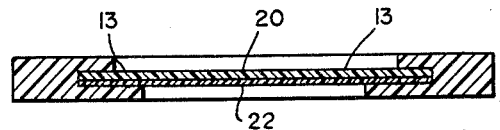

The film strip can be easily removed from the film holder simply by placing a force F, such as the thumb on the bottom side of the film strip so that the sandwich will again assume an arcuate shape. The ends A and B as shown in FIGURES 3 and 4 will then remove themselves from the slots 13. The holder is now ready for use with a new film strip. The act of assembly and disassembly may be repeated as often as necessary without any danger of damage to the parts. Also the assembly and disassembly is so simple that they may be performed in a room with no more light than the projector emits. The emulsion side of the film strip is the only side which requires protection and for this reason only one piece of frosted plastic need be used so long as this piece is placed such that the film strip 22 is seated between the ledge 13 and the plastic strip 20. This combination is shown in FIGURE 7.

The first model constructed was composed of three sheets of plastic properly shaped and subsequently laminated together. The mount can also be constructed by:

Injecting liquid plastic into a die as shown in FIGURE 2; forming the lower half by injecting liquid plastic into a die to form the lower half of the holder and laminating a flat sheet of plastic to the molded bottom piece as shown in FIGURE 2A; or laminating three pre-cut sheets of plastic material as shown in FIGURE 2B. All of the above methods of manufacture were tested and the results were favorable in each case.

The frosted plastic proved far superior to clear plastic. The mounts were purposely handled in a careless manner before projection. Close observation before projection insured the fact that there were fingerprints on the frosted plastic, yet upon projection no marks are observable at all to the human eye. This test was repeated using transparent plastic material and in this case the fingerprints were clearly recognizable thus proving the superiority of the frosted plastic strips in combination with the improved mounting member.

It will be apparent to those familiar with the art that the device is capable of numerous modifications without departing from the spirit of the invention. It is desired, therefore, not to limit the invention except as defined in the following claims.

What is claimed is:

1. For use in photographic viewing apparatus a mounting for rectangularly shaped transparencies, said mounting having an obverse side and a reverse side, said obverse side having a first rectangularly shaped central opening, said reverse side having a second rectangularly shaped central opening; said first and second rectangular openings being concentric with respect to one another, said obverse opening being smaller than said reverse opening thereby forming a steplike ledge configuration therebetween, first and second parallel sides of said second opening each having a generally U-shaped slot positioned adjacent its associated ledge and traversing the length of said side; at least one rectangularly shaped translucent member having dimensions adaptable for insertion into the said U-shaped slots; said translucent member cooperating with said mount to position and secure a photographic transparency therebetween, said translucent member being sufficiently resilient to permit bending thereof for insertion into said U-shaped slots; said mounting having substantially more rigidity than said translucent member to prevent bending of said mounting during either insertion or removal of said translucent member from said mounting; the width of said U-shaped slots being sufficient to accommodate said resilient member and a photographic transparency therein; the distance between the bases of said U-shaped slots being substantially equal to the length of said rectangularly shaped translucent member, the distance between the third and fourth sides of said second opening being substantially equal to the width of said translucent member; the ledges of the first and second sides adjacent said U-shaped slots being adapted to facilitate insertion of said translucent member and said transparency; the ledges of the third and fourth sides perpendicular to said U-shaped slots being adapted to facilitate removal of said translucent member and said transparency.

2. For use in photographic viewing apparatus a mounting for rectangularly shaped transparencies, said mounting having an obverse side and a reverse side, said obverse side having a first rectangularly shaped central opening, said reverse side having a second rectangularly shaped central opening; said first and second rectangular openings being concentric with respect to one another, said first opening being smaller than said second opening, thereby forming a steplike ledge configuration therebetween, first and second parallel sides of said second opening each having a generally U-shaped slot positioned adjacent said ledge and traversing the length of each of said sides; first and second rectangularly shaped translucent members each having a configuration adapted for insertion into said U-shaped slots; said first and second translucent members cooperating to position and secure a photographic transparency therebetween, said first and second translucent members being sufficiently resilient to permit bending thereof for insertion into said U-shaped slots; said mounting having substantially more stiffness than said first and second translucent members to prevent bending of said mounting during either insertion or removal of said translucent members from said mounting; the width of said U-shaped slots being sufficient to accommodate said first and second resilient member and a photographic transparency therein; the distance between the bases of said U-shaped slots being substantially equal to the length of said rectangularly shaped translucent members, the distance between the third and fourth parallel sides of said second opening being substantially equal to the width of said transulcent members; the ledges of the first and second sides adjacent said first and second U-shaped slots being adapted to facilitate insertion of said translucent members and said transparency; the ledges perpendicular to said U-shaped slots being adapted to facilitate removal of said transulcent members and said transparency.

References Cited in the file of this patent

UNITED STATES PATENTS

| | | |
|---|---|---|
| 1,317,946 | Snively | Oct. 7, 1919 |
| 2,643,577 | Williams | June 30, 1953 |
| 2,843,955 | Engelstein | July 22, 1958 |
| 2,861,368 | Rosenberg | Nov. 25, 1958 |
| 2,861,370 | McArthur | Nov. 25, 1958 |

FOREIGN PATENTS

| | | |
|---|---|---|
| 924,473 | France | Mar. 17, 1947 |